Dec. 13, 1949     H. P. SERIO     2,490,838
HANDLE ATTACHMENT FOR COOKING UTENSILS
Filed April 13, 1948     2 Sheets-Sheet 1
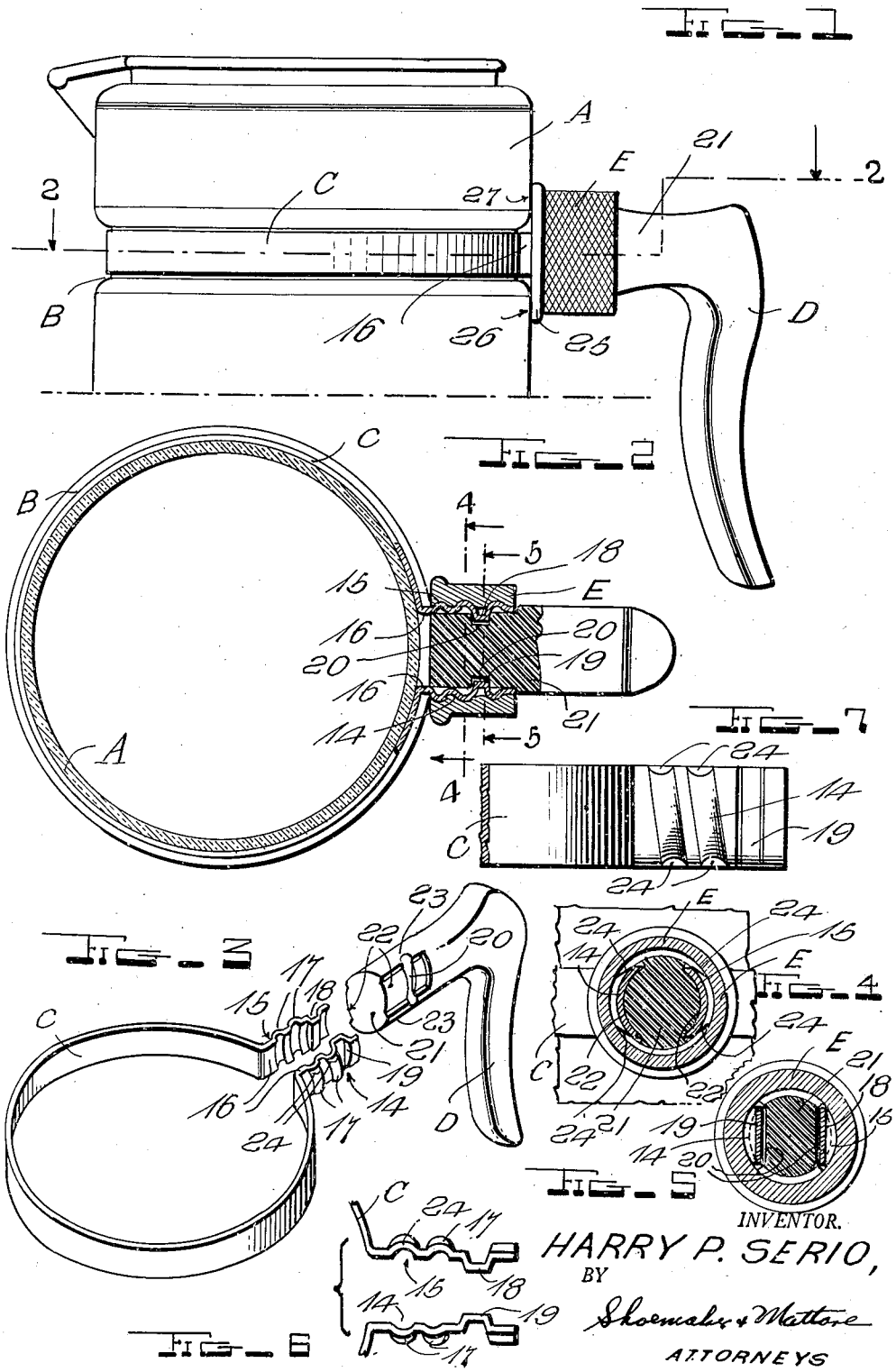
INVENTOR.
HARRY P. SERIO,
BY
Shoemaker & Mattore
ATTORNEYS

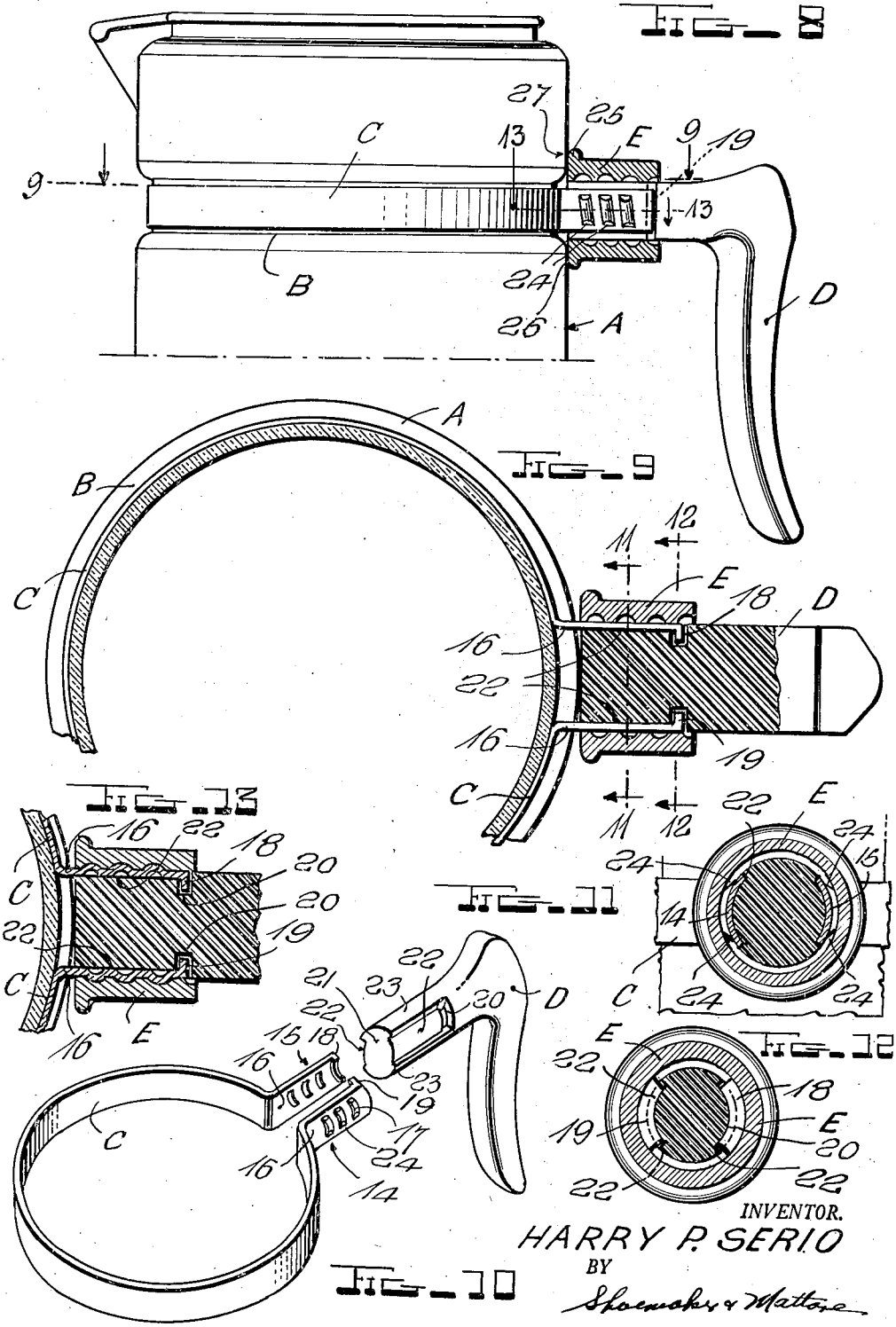

Patented Dec. 13, 1949

2,490,838

UNITED STATES PATENT OFFICE 2,490,838

HANDLE ATTACHMENT FOR COOKING UTENSILS

Harry P. Serio, Elmira, N. Y.

Application April 13, 1948, Serial No. 20,787

6 Claims. (Cl. 294—27)

1

This invention relates to handle attachments for cooking utensils.

The invention is more particularly directed to that type of handle attachment for glass or other vessels wherein a substantially circular metallic or other band is disposed in a circumferential groove in the vessel and the band is provided with outwardly extended partially threaded ends which cooperate with a handle and which ends of the band and the handle are secured together by means of a nut or the like.

The outwardly extended free ends of the aforesaid metallic or other band, in prior devices of the present character, are provided with partial exterior screw threads. When the band is of metal and the formation of the partial screw threads is effected by a stamping operation, the edges of the screw threads are rather sharp and this results in the cutting of the threads within the nut that secures the band and the handle together about the vessel. The sharp edges of the threads act really as a tap and disfigure or otherwise ruin the screw threads in the nut. In prior devices of the present character the end portion of the handle was partially screw threaded, which screw threads coincide with the partial screw threads on the free ends of the band, thus resulting in a continuous thread, formed partially by the ends of the band and portions of the end of the handle.

In the present invention I provide novel screw threads which are only on the free ends of the band. The end portion of the handle with which the free screw threaded ends of the band are associated is smooth surfaced and is not provided with any screw thread formation. The threads that are formed on the free ends of the band are such that they will not disfigure or otherwise distort the interior screw threads of the nut which secures the band and handle to the vessel. Moreover, in the use of the handle with its smooth end portions free of screw threads, I am enabled to more readily and very quickly associate the interiorly screw threaded nut with that end of the handle which is accomplished by simply inserting the smooth free end of the handle in the opening in the nut and backing the nut on the handle and then, by associating the screw threaded free ends of the band with the handle it is a simple matter then to readily and quickly screw thread the nut on the screw threaded end portions of the band and thus the band and handle are effectively, securely and immovably associated with the vessel.

With the foregoing in mind, it is an object of

2 my invention to provide a band and handle attachment for vessels or cooking utensils wherein the same is capable of being produced in mass production and in accurate formation and quite inexpensively and yet possesses all of the desired characteristics of durability and efficiency in use.

Another object of my invention is to provide a band and handle attachment for cooking vessels or utensils wherein the end portion of the handle is smooth and free from any screw thread formation and is provided with channels in which are disposed the free screw threaded ends of a metallic or other band.

Another object of my invention is to provide a band and handle attachment for cooking vessels or utensils wherein the end of the handle is smooth and channeled and free of any thread formation and where the threaded free ends of the band are disposed in the channels and the threads on the band are such that they will not act in a detrimental manner with respect to the interior screw threads of the nut that is utilized to secure the band and handle to the vessel or utensil.

Another object of my invention is to provide a band and handle attachment for cooking vessels or utensils wherein the handle portion, which has associated with it the free threaded ends of the band, is smooth and does not have formed therein any screw thread formation and the ends of the band are provided with means for locking the same to the end of the handle.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a partial side elevational view of the band and handle attachment associated with the cooking vessel or utensil;

Fig. 2 is a horizontal sectional view on the line 2—2 of Fig. 1;

Fig. 3 is an exploded perspective view of the band and handle attachment;

Fig. 4 is a transverse vertical sectional view on the line 4—4 of Fig. 2;

Fig. 5 is a transverse vertical sectional view on the line 5—5 of Fig. 2;

Fig. 6 is a top elevational view of a portion of the band and handle attachment showing particularly the formation of the threads and the locking means on the free ends of the band;

Fig. 7 is a fragmentary side elevationl view showing the formation of the screw threads and the locking means on one end of the band;

Fig. 8 is a side elevational view, partly in section, showing a modification of the invention;

Fig. 9 is a horizontal sectional view on the line 9—9 of Fig. 8;

Fig. 10 is an exploded perspective view of the band and handle attachment;

Fig. 11 is a transverse sectional view on the line 11—11 of Fig. 9;

Fig. 12 is a transverse sectional view on the line 12—12 of Fig. 9; and

Fig. 13 is a horizontal sectional view showing the ends of the bands associated with the ends of the handle and connected with the vessel.

The invention will be more readily understood by referring to the drawings in detail, wherein like reference numerals in the several figures denote the same part.

The vessel or utensil A, which may be of glass such as "Pyrex," or other suitable material, is provided with a circumferential groove B within which groove the metal or other band C is disposed and which band is provided with free ends that are associated with the handle D and which handle and the free ends of the band are secured together and to the vessel by means of a metal or plastic interiorly threaded nut E.

The metal band C has outwardly extended screw threaded free ends 14 and 15. At the juncture of the outwardly extending free ends with the band proper there is a substantially straight portion of the free ends denoted at 16. This substantially straight portion 16 (see Figs. 2, 9 and 13) is substantially the depth of the circumferential groove B and serves a function later to be described in detail. The free ends 14 and 15 of the band C are each provided with exterior screw threads 17 and there may be two or more of such threads on each end of the band. These free ends of the band in Figs. 1 through 7 and in Figs. 8 through 13, are provided, respectively, with an inwardly directed oppositely disposed locking rib or projection 18 that is inwardly of the extreme free ends or by turning in the extreme free ends in the form of projections 18 and 19.

The locking projections 18 and 19 when the band is associated with the handle, or vice versa, enter and are disposed in oppositely formed recesses 20 that are inwardly of the end 21 of the handle. These recesses 20 are within oppositely disposed channels 22 and the portions 23 of the handle between the channels are perfectly smooth and free of any screw thread formation whatsoever.

With regard to the screw threaded free ends of the band C, the same may be beveled, as at 24 in Figs. 1 through 7, or these screw threads may be formed as in Fig. 10, wherein they do not extend to the opposite edges of the free ends of the band but are spaced inwardly thereof and both ends of the screw threads are beveled or inclined, as denoted at 24. It will be noted that in the screw thread formation in Fig. 10 and in the other views 11 and 12, and also in the views 3, 6 and 7, the beveled edges of the screw threads are at both ends of the screw threads and this is so, whether or not the screw threads extend to the opposite edges of the metal band, as in Fig. 7, or whether these screw threads terminate inwardly of the edges of the free end of the band, as in Fig. 11.

From the foregoing description it will be noted that when the band C is disposed in the circumferential groove B of the vessel, the straight or right angularly disposed portions 16 of the free ends of the band are disposed in the said groove and that the length of said portions is substantially that of the depth of the groove. In other words, when the band is disposed in the groove there is a very close contact between the band and the base of the groove and this is so when the ends of the band are brought together and associated with the channels in the end of the handle, thus disposing the portions 16 of the ends of the band in a substantially right angular position within the groove and these straight or right angular portions serve as a means of adjustability of the band with respect to the vessel. It is clear that when the nut E is brought home on the threads 17 of the free ends of the band and when the inner end 25 of the nut engages upper and lower portions 26 and 27 of the vessel, a very effective and secure connection of the handle with the band and vessel is accomplished.

Should it be necessary to obtain an adjustment or to provide additional tension on the band with respect to the vessel, then by further tightening of the nut E the straight walled or right angularly disposed portion of the free ends of the band will be pulled away from their position within the circumferential groove B. In the majority of instances it will not be necessary, however, to tighten the nut E to such an extent that it will pull the portions 16 of the band away from the position they occupy within the circumferential groove but this can be done to effect adjustability and for taking care of slight differences in the circumferential area of the groove.

In assembling my band and handle attachment with a vessel or utensil it is simply necessary to place this band, which possesses inherent springy and flexible characteristics, in the groove of the vessel and then, when the free threaded ends of the band are in expanded condition, insert or place the unthreaded smooth end of the handle between the free ends of the band and bring either the locking projections 20 or 19 into their respective recesses and then the nut which has been previously applied to the shank of the handle is simply screwed home on the screw threads that are provided on the free ends of the band and continue to turn the nut until its end portion 25 engages the vessel at points 26 and 27, which are below and above the circumferential groove B. When this has been accomplished the band and handle are immovably and fixedly secured to the vessel. In other words, when the handle and band are associated with the vessel there is no relative movement between the two. Thus accidents are prevented where the handle might have relative movement with respect to the vessel.

By the particular formation of the screw threads on the free ends of the band, namely, by beveling or inclining the ends of the threads, whether such threads are inwardly of the side edges of the free ends of the band or not, as denoted in the two modifications of the invention, if necessary, the nut may be removed and replaced at will, without any danger of injuring or distorting the interior screw threads of the same. In this assembling operation, and in view of the fact that the end of the handle which has associated therewith the exteriorly screw threaded ends of the band, and this end of the handle being perfectly smooth and free of screw threads, a very quick and ready association of the handle and band attachment is effected.

I claim:

1. A band and handle attachment for cooking utensils wherein the band is substantially circular and is provided with outwardly extending spaced screw threaded free ends having end edges and inner and outer faces, the free ends of the band each having an inwardly directed locking projection on its inner face intermediate the juncture of the ends with the circular portion of the band and the said end edges intermediate the said ends of the band, the handle having oppositely disposed channels therein, oppositely disposed recesses in the channels, the free ends of the band being disposed in the channels with the locking projections in the recesses, and that portion of the handle between the oppositely disposed channels having a smooth uninterrupted surface, and a nut for securing the band and handle together and to the utensil.

2. A band and handle attachment for cooking utensils wherein the band is substantially circular in outline and is provided with outwardly extending exteriorly screw threaded free ends, said band being adapted to be disposed in a circumferential groove in the body of the utensil, substantially straight and right angularly disposed portions of each of the free ends at the juncture of the band and the free ends, the length of said straight portions of the free ends of the band being of substantially the depth of the groove and disposed in the groove, the handle having oppositely disposed channels therein with the free ends of the band, not including the said straight portions, being disposed therein and the remainder of the handle having a smooth curved surface, and a nut for engaging the screw threaded free ends of the band in the channels of the handle for securing the handle and band together and to the utensil.

3. A band and handle attachment for cooking utensils as described in claim 2, wherein the ends of the exterior screw threads on the free ends of the band are beveled.

4. A band and handle attachment for cooking utensils as described in claim 2, wherein the ends of the exterior screw threads on the free ends of the band are inset from the side edges of each free end of the band.

5. A band and handle attachment for cooking utensils as described in claim 2, wherein the free ends of the band are provided with inwardly directed locking projections and oppositely disposed recesses in the channels are provided for receiving the locking projections therein and the exterior screw threads on the ends of the band have their ends inclined.

6. A band and handle attachment for cooking utensils wherein the utensil is provided with a circumferential groove, the band being substantially circular in outline and disposed in the groove and having outwardly extending spaced exteriorly screw threaded free ends, the handle having oppositely disposed channels therein and recesses in each channel, the free ends of the band having exterior screw threads thereon the ends of which threads are beveled, inwardly directed locking projections on each of the free ends of the band and which free ends and the projections are disposed in the channels and the recesses, respectively, of the handle, the portions of the handle between the oppositely disposed channels being smooth and uninterrupted, and an interiorly threaded nut secured only to the threads of the free ends of the band and having its inner end in engagement with portions of the vessel above and below the circumferential groove at the point where the handle is positioned.

HARRY P. SERIO.

No references cited.